(12) United States Patent
Newell et al.

(10) Patent No.: US 8,131,206 B2
(45) Date of Patent: Mar. 6, 2012

(54) ACCOUNT TRACKING SYSTEM

(75) Inventors: Nicholas B. Newell, Highlands Ranch, CO (US); David A. Kummer, Highlands Ranch, CO (US); Kranti Kilaru, Castle Rock, CO (US); William N. Moran, Highlands Ranch, CO (US); Jason Anguiano, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 657 days.

(21) Appl. No.: 12/324,584

(22) Filed: Nov. 26, 2008

(65) Prior Publication Data

US 2010/0130141 A1    May 27, 2010

(51) Int. Cl.
*H04H 60/09* (2008.01)
*H04N 7/16* (2006.01)

(52) U.S. Cl. ...................................... 455/3.02

(58) Field of Classification Search ................. 455/3.02, 455/3.05, 3.06; 725/9–20, 25, 27–31, 109, 725/110, 123
See application file for complete search history.

(56) References Cited

U.S. PATENT DOCUMENTS

| 6,975,204 B1 * | 12/2005 | Silver | 340/5.31 |
| 7,039,169 B2 * | 5/2006 | Jones | 379/93.02 |
| 2008/0163285 A1 * | 7/2008 | Tanaka et al. | 725/25 |

FOREIGN PATENT DOCUMENTS

JP     2004312505 A   *  11/2004

* cited by examiner

*Primary Examiner* — Howard Williams
(74) *Attorney, Agent, or Firm* — Dorsey & Whitney LLP

(57) ABSTRACT

The present invention is directed to a system and method for identifying and responding to missing or absent receivers. The invention includes determining, at a particular receiver that is a member of a group of receivers, that one member of the group is currently or was at a particular time missing, absent or otherwise unresponsive. Embodiments of the invention are directed to notifying a service provider of a receiver status or absence, which, in response, may take one of a number of predetermined actions.

23 Claims, 5 Drawing Sheets

ACCOUNT TRACKING SYSTEM

FIELD OF THE INVENTION

The present invention is generally directed to a system and method for tracking the usage of a receiver for a broadcast service.

BACKGROUND

Account packing is an ongoing issue often encountered by fee-based or other broadcast services. This situation occurs when a subscriber (or other user of a broadcast service) has more than one receiver and operates at least one of those receivers outside the terms of his or her service agreement or other agreement that sets forth the manner in which a receiver may be used. In particular, if a user has or maintains a plurality of receivers, it may be desired by a service provider that all the receivers are located and used within the same household or location. However, many users allow friends or family to use one or more receivers in a location separate from the permitted location.

A receiver is not required to be in a specific location in order to decrypt or decode an incoming satellite broadcast. In particular, a receiver may typically be used at any location, provided that the receiver is enabled with the appropriate decryption codes. This fact provides an opportunity for an unscrupulous subscriber or user to violate with impunity the terms of his or her agreement with a service provider. Accordingly, it would be desirable to have a system and method for monitoring the usage of a receiver within a particular location.

SUMMARY

The present invention is directed to a system and method for identifying and responding to missing or absent receivers. One embodiment of the invention takes the form of a method for determining, at a particular receiver that is a member of a group of receivers, that one member of the group is currently or was at a particular time missing, absent or otherwise unresponsive. Embodiments of the invention are directed to notifying a service provider of a receiver status or absence, which, in response, may take one of a number of predetermined actions.

Another embodiment is a method of managing a group of receivers, including receiving an incoming message at a first receiver, the first receiver being a member of a group of receivers, the incoming message including information usable by the first receiver to identify all members of the group of receivers through a first network, receiving, at the first receiver and over the first network, an indication of a status at least one receiver in the group of receivers, and sending an outgoing message from the first receiver including a notice of the status of the at least one receiver.

Yet another embodiment is directed to a method of managing a group of receivers including sending an outgoing message to each of a plurality of receivers, each outgoing message including information usable by a particular receiver to identify all others of the plurality of receivers, receiving an incoming message including a status of the group of receivers, an indication that a first receiver of the plurality of receivers has detected an absence of at least a second receiver of the plurality of receivers, and in response to receiving the message, taking at least one predetermined action.

A further embodiment may take the form of a system including a first receiver, the receiver being a member of a group of receivers, the group including at least a second receiver, the first receiver including a tuner operable to receive a signal, a decoder connected to the tuner and configured to decode the signal into a data set, the data set including information usable by the first receiver to identify all members of the group of receivers, a storage device connected to the decoder and configured to digitally store the data set, a processor connected to the storage device and configured to send and receive data over a network, data received over the first network including at least an indication of a status associated with at least one receiver in the group of receivers; and a network interface connected to the processor and being operable to provide a connection to the first network, the first network interconnecting the group of receivers, wherein the network interface is further operable to send a notice of the status associated with the at least one receiver.

DETAILED DESCRIPTION OF EMBODIMENTS

Embodiments of the present invention are directed to systems and methods for identifying and responding to a missing or absent receiver or other electronic device. As used herein, a "receiver" includes any device or apparatus operable to receive a broadcast signal and to decode that signal into a format usable for displaying video and/or audio content. A receiver may include such devices as, for example, set-top box receivers, cable television receivers, network computers and so on. A customer or other user of a broadcast service may have certain stipulations regarding his or her usage of one or more receivers. Such stipulations may, among other things, require that each of a plurality of receivers be located and used only with the user's household. In such a situation, one receiver may be placed, for example, in a family room or living room, a second receiver may be placed in a bedroom and a third receiver may be placed in a kitchen. Within the parameters authorized by the broadcast service provider or other seller/operator of the receiver, these multiple receivers may be linked to a single customer account and typically used in a single location, such as a single house.

Generally, the term "missing" or "absent" is used herein to refer to a receiver that is not in use or otherwise operative at a location permitted within terms of an agreement a user has with a service. In one embodiment, a particular receiver is identified as being missing and/or absent if this receiver is unresponsive to communications directed to it from other associated receivers. Further, two or more receivers are "associated" with each other if those receivers are allocated to a particular customer or are tied to the same account.

Embodiments of the present invention are directed to combating or otherwise mitigating a violation of a user agreement wherein the user uses, or allows use of, one or more of his receivers in a premises or household other than those authorized. Generally the terms "user" and/or "subscriber" refer to an individual or company who receives a satellite broadcast. This may include those who have purchased a subscription to the broadcast. Alternatively, the terms "user" and/or "subscriber" may refer to individuals who have been given access to the broadcast service through promotional offers and/or other non-fee-based agreements. A "subscriber agreement" or a "user agreement" herein refers to an agreement between a service provider and a user that sets forth one or more terms that the user or subscriber agrees to as a condition for using of one or more receivers. No limitations on the form in which the subscriber agreement may take are assumed or implied. In particular, the subscriber or user agreement may be written, verbal and/or implied and so on.

Figure 1:
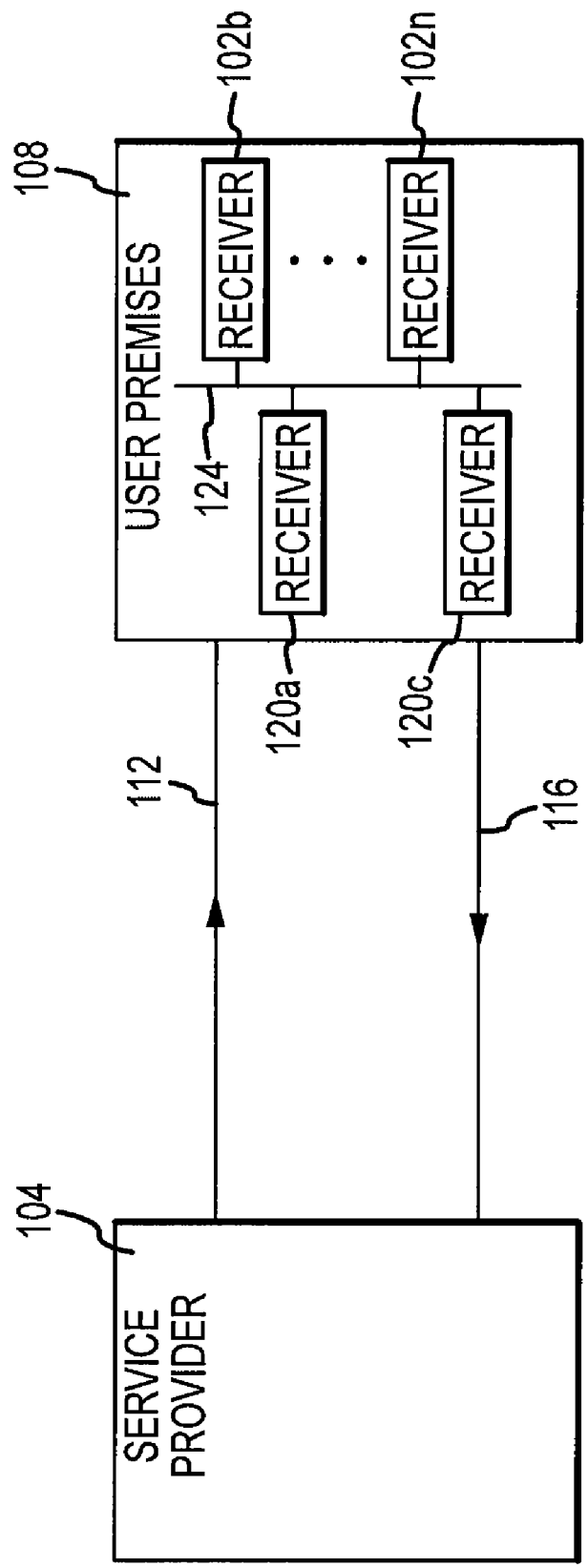
FIG. 1 is a schematic illustration of an operating environment showing components and features of the present invention.

FIG. 1 is a schematic illustration of a general operating environment showing components and features of a first embodiment. FIG. 1 includes a service provider 104 that provides product service for a user 108. As used herein, a service provider 104 may include any broadcast service to which a subscription may be purchased or otherwise acquired. A service provider 104 may include, without limitation a satellite broadcast service, a direct television broadcast service and/or a cable television broadcast service. A user 108 may be an individual and/or a business that subscribes to and receives a broadcast service from a service provider 104.

The service provider 104 transmits a signal along a first communication path 112 to the user 108. Additionally, the user 108 may request information or changes to his or her account over a second communication path 116 provided between the user 108 and the service provider 104.

A user 108 may have or otherwise be associated with an account. In addition, the account may likewise be associated with one or more receivers 120a-n. The receivers 120a-n may be in communication with each other over a network 124. It should be understood that the term "broadcast" generally embraces not only satellite or terrestrial broadcasts, but also transmission of information across any wired or wireless transmission medium. Accordingly, a broadcast encompasses transmission of information across a cable network (for example a cable headend to cable receiver), an Internet or other computer-accessible medium (including a local area network, wide-area network, and so on), a wireless network such as a radio frequency or infrared network, and so on.

Figure 2:
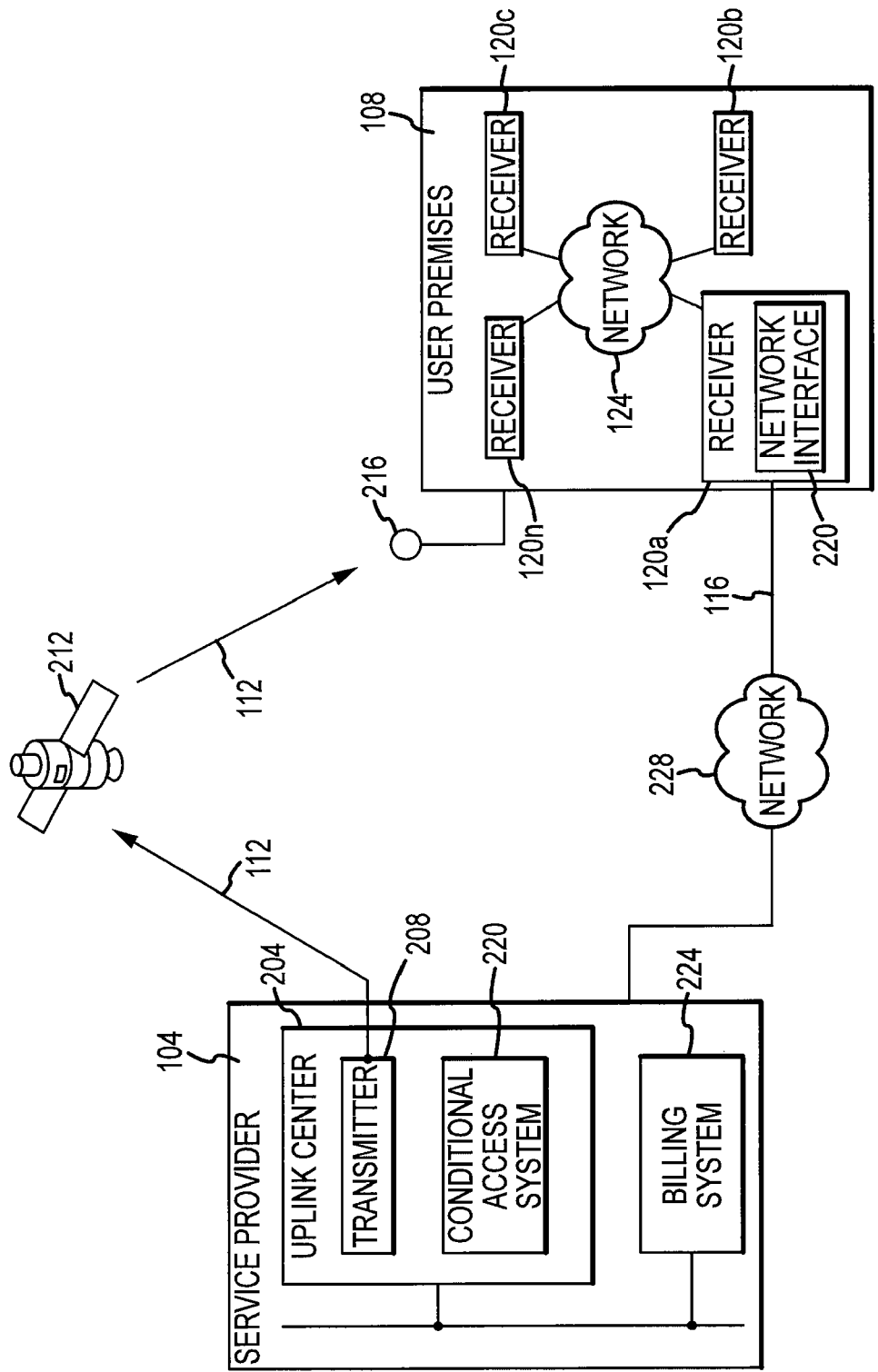
FIG. 2 is a schematic illustration of an operating environment showing components and features of an embodiment of the present invention that operates in the context of a satellite broadcast system.

FIG. 2 is a schematic illustration of an operating environment showing components and features of an embodiment of the present invention that operates in the context of a satellite broadcast service, as a further refinement of the general operating environment of FIG. 1. As shown in FIG. 2, a service provider 104 may include an uplink center 204 having a transmitter 208. The transmitter 208 is operable to transmit a modulated signal having data representing audio and/or visual content. The modulated signal is received at a satellite 212. The satellite 212, in turn, rebroadcasts the modulated signal, which is then received at one or more terrestrial locations. In receiving the broadcasted satellite signal, a user premises 108 or location may include one or more satellite dishes 216.

The signal sent by the transmitter 208 may be encrypted to prevent unauthorized access to the broadcast content. At the user premises 108, a decryption key allows the user access to the broadcast content. As can be appreciated, the broadcast signal includes a plurality of channels. Access to the various channels will depend on a particular user's agreement or other terms of usage between the user or the service provider 104. In particular, the entire broadcast signal is received at the satellite dish 216 however, only those portions for which the user has paid or been given access to will be accessible.

Access to the various portions of the transmitted signal is managed by a conditional access system 220, which is associated with the uplink center 204. Through messages sent by the transmitter 208, the conditional access system 220 controls access to the broadcast signal and/or portions of the broadcast signal. In doing so, the conditional access system 220 may be provided with information from a billing system 224. The billing system 224 may optionally be located within the uplink center 204 or remote from the uplink center 204. The billing system 224 may manage subscriber or other user accounts including changes in account status and receipt of account payments. The billing system 224 may also provide information to the conditional access system 220 including information regarding which channels a particular user is entitled to view. Based on this information, the conditional access system 220 may format a message called an entitlement management message (EMM) for transmission through the transmitter 208.

A particular EMM may be directed to all receivers associated with a particular account and may stipulate which portions of the transmitted signal the receiver 120a is allowed to decrypt. A particular EMM is sent along with other broadcast content via the first communication path 112. An EMM may be sent, for example, in response to a change of account status. Specifically, if a new receiver 120a is enabled, an EMM will be sent over the communication path 112 to the receiver specifying which channels the receiver 120a is to be allowed access. If a subscriber purchases access to an additional channel, one or more EMMs may be sent allowing access to the new channel, optionally, once payment has been received and verified by the billing system 224. It should be appreciated that, for a user having more than one receiver, in some embodiments an EMM may be sent for each receiver 120a-n in the case that the change in account status is applicable to each receiver 120a-n associated with the user. Accordingly, a function of the billing system 224 may be to monitor and track the various receivers 120a-n that are associated with a particular user account. In accordance with embodiments of the present invention, one or more EMMs may be sent that provide information to a group of receivers 120a-n, thereby permitting a particular receiver 120a to identify the other receivers 120b-n as being members of an account group. Such information is referred to herein as "account group information."

At the user premises 108, a particular receiver 120a may include a network interface 226. The network interface 226 is generally operable to communicate or send information to the service provider 104 along the second communication path 116. In accordance with certain embodiments of the present invention, the network interface 226 may include a modem, which may communicate over a network 228. The network 228 may include standard telephone lines associated with the public switched telephone network (PSTN). However, it should be appreciated that the network 228 may include any type of network capable of data communication, such as for example, a local or wide area network or the Internet. Through communication path 116, a user may change his or her account status including taking such actions as adding or cancelling channels and/or ordering pay-per-view content.

The user premises 108 may include a network 124 that provides a communication path and/or means of information interchange between the receivers 120a-n. In accordance with embodiments of the present invention, the network 124 may include or be implemented through Homeplug® technology, or other home networking solutions. Homeplug® is a system that allows data communication to take place through the power lines that are distributed throughout a typical household. In particular, a device may plug into a wall to receive power and, in addition to this standard function, may be operable to transmit and receive data through the power connection. Using this technology, the receivers 120*a-n* may communicate with each other through the normal power lines associated with the household or other premises.

Through the network 124, the receivers 120*a-n* may communicate with each other using any suitable communication protocol such as TCP/IP. Using the account group information, the receivers 120*a-n* may be able to identify and monitor each other over the network 124. In one embodiment, the receivers 120*a-n* are implemented as set-top box receivers. In this embodiment, the account group information may include all or a portion of a smart card ID and/or all or a portion of a receiver ID.

Figure 3:
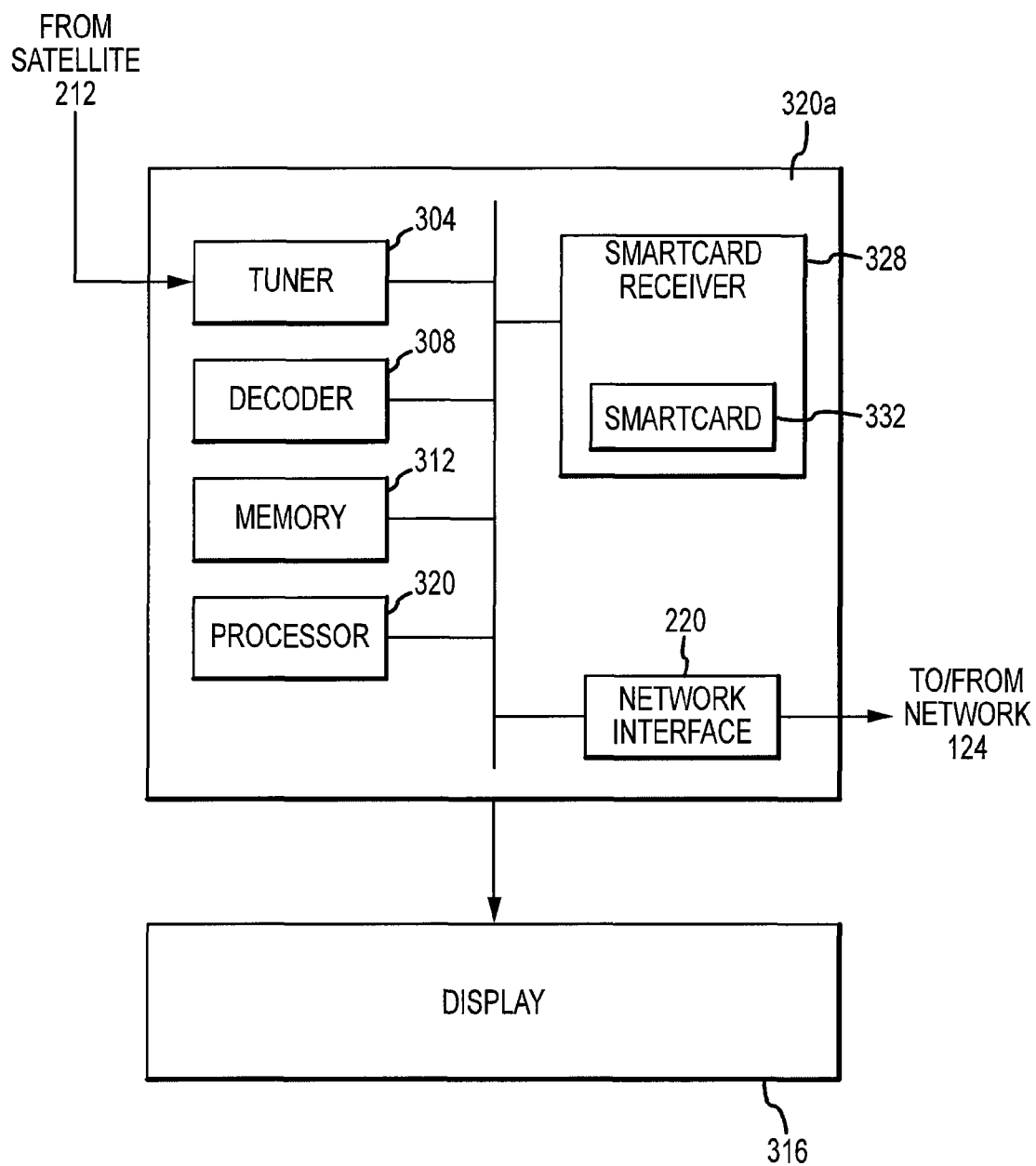
FIG. 3 is a schematic illustration of a set top box receiver in accordance with the embodiments of the present invention.

A set-top box type receiver 120*a* is shown in FIG. 3 and may include a tuner 304 operable to receive a signal broadcast from satellite 212. The set-top box receiver 120*b* also typically includes a decoder 308 operable to decode the received signal. As indicated above, the decoder 308 may selectively decode portions of the signal received from the satellite 212 based on account information received through an EMM sent by the conditional access system 220. A memory 312 or other storage device, such as a magnetic or optical memory, is additionally provided to store data received from a decoded satellite signal. The stored data set may include audio and/or visual content to be transmitted and displayed through display 316. The memory 312 may also be used to store account group information received in connection with a particular EMM. The set-top box receiver 120*a* additionally includes a processor operable to perform such tasks as sending audio and/or visual content to display 316 and to communicate with other receivers 120*b-n* through a network interface 226. The set-top box receiver 120*a*, shown in FIG. 3, may additionally include a smart card receiver 328 adapted to receive a smart card 332. The smart card 332 allows the set-top box receiver 120*a* to be associated with a user account and to operate in accordance with the user's preferences, and/or levels of access.

Figure 4:
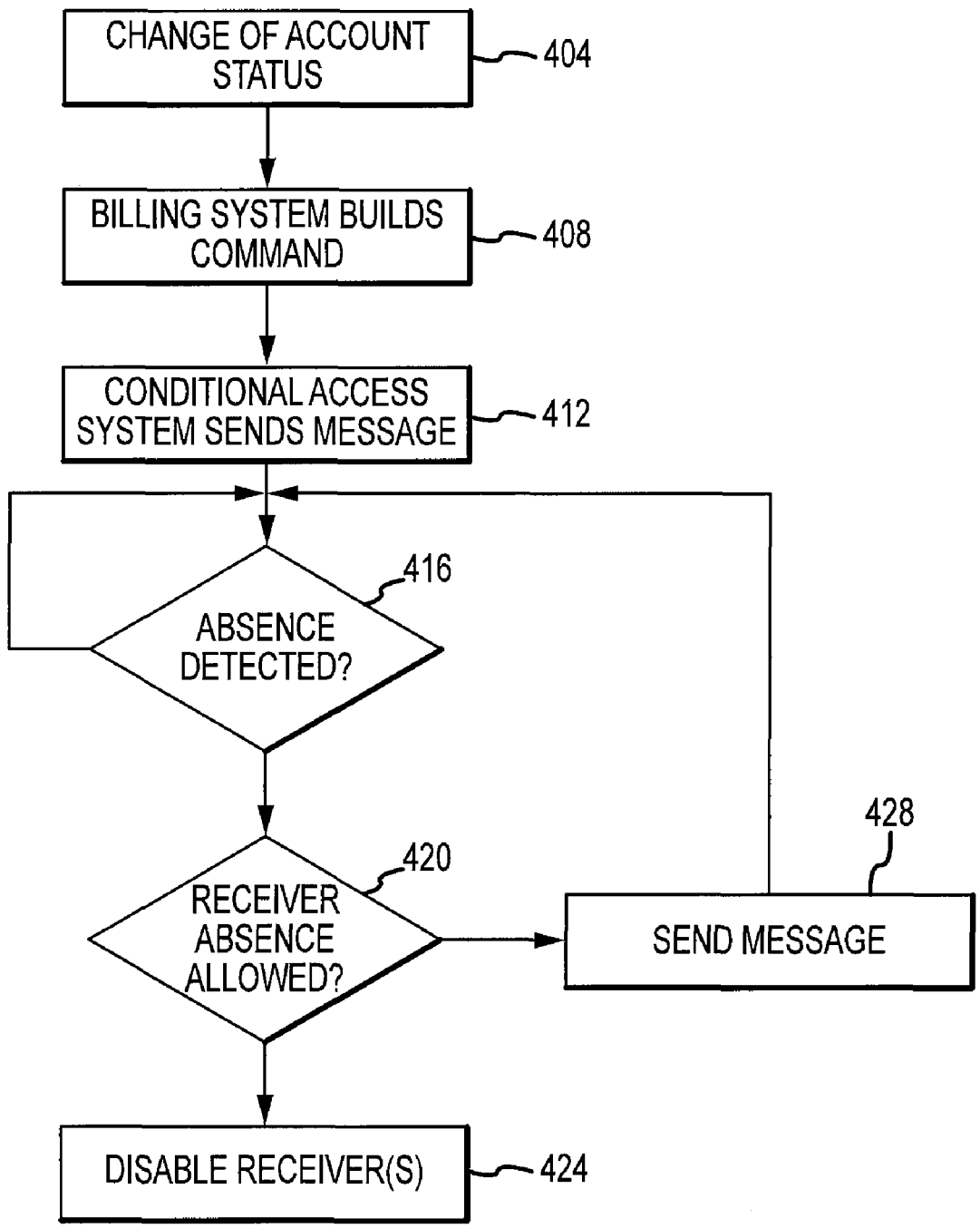
FIG. 4 is a flow chart illustrating operations in a method in accordance with the embodiments of the present invention.

As mentioned above, the present embodiment is directed to a system and method for identifying and responding to a missing or absent receiver. In this regard, the embodiment, or a service provider associated therewith, may include a conditional access system 220 operable to send and receive information to and from a group of associated receivers 120*a-n*. Turning now to the operation of a sample conditional access system 220, reference is made to FIG. 4. Initially, at operation 404, a change of account status occurs. In particular, an account may be created and/or one or more set-top boxes may be added or deleted to or from the account. In accordance with the embodiment, this change in account status may trigger providing new or updated account group information to each of the receivers 120*a-n* belonging to the account group.

In operation 408, the billing system 224 builds a command to be sent to each receiver 120*a-n* belonging to an account. The command sent to each receiver 120*a-n* may include information regarding the account and its members. In one embodiment, a command may include an account number and/or a telephone number. Each command may additionally include identification information usable by a particular receiver 120*a-n* to identify all members of the account group. With reference to FIG. 2, for example, a command sent to receiver 120*a* may include information usable by receiver 120*a* to identify receivers 120*b-n*. In one embodiment, the identification information includes a receiver identification (ID) and a smart card ID. Due to bandwidth constraints that may be imposed by the message transmission format or media, the identification information may include only a portion of the receiver ID and a portion of the smart card ID. By including the last four digits of the receiver ID and last four digits of the smart card ID, the receiver 120*a-n* and smart card 332 pair can be uniquely identified within a statistically insignificant margin of error.

A particular command sent to a receiver 120*a* may indicate whether the receiver 120*a* is to operate in a master mode or in a slave mode. As described in greater detail below, the operation of a receiver 120*a* will depend on whether it is operating in master mode or slave mode. A particular command may additionally include an indication of whether or not the receiver 120*a* is Homeplug® or other network compatible. Once the billing system 224 compiles or builds a command for each receiver 120*a-n* associated with a particular account, operation 412 may follow.

In operation 412, the conditional access system 220 sends a number of EMMs that include the commands built in operation 408. In particular, the conditional access system 220 formats the commands and incorporates them into an EMM that is to be sent along with other data representing audio and/or visual content. The EMMs are then sent to the receivers 120*a-n* associated with the user across the communication path 112.

At decision 416, a determination is made by the conditional access system 220 as to whether or not a missing or absent receiver has been detected by a receiver 120*a-n* at the user premises 108. The operations involved in making this determination at the user premises 108 are described in greater detail below in connection with FIG. 5. At the conditional access system 220, this includes receiving a message sent by one or more of the receivers 120*a-n* associated with a particular account. As described below, determining that a receiver is absent may include not receiving a periodic notification that all receivers are present. At the conditional access system 220, when such an indication is received, operation 420 follows operation 416.

At operation 420, the conditional access system 220 determines whether the detected receiver 120*a-n* absence is allowed. More particularly, the system determines if the remaining receivers should be shut down or rendered at least temporarily inoperable due to the receiver's 120*a-n* absence, in which case operation 424 is executed. For several reasons, an absence of a receiver may be tolerated by the conditional access system 220. Detecting an absence of a receiver 120*a-n* may not necessarily indicate that the user is packing the account. For instance, a particular receiver 120*a-n* may be turned off and disconnected from the network 124. Here, the disconnected receiver 120*a-n* may be located within the user's household or premises and in a non-operating condition. Moreover, in connection with embodiments that include a Homeplug® network, a fuse may be blown in the household leading to the inability of one or more receivers 120*a-n* to receive or respond to a network query. Accordingly, it may be the policy of the service provider 104 to at least initially provide a message to the user 108 indicating that one or more of his receivers 120*a-n* cannot be detected, as in operation 428. This condition may be allowed to persist for a predetermined amount of time before the service provider 104 disables one or more of the receivers 120*a-n* associated with the account.

Figure 5:
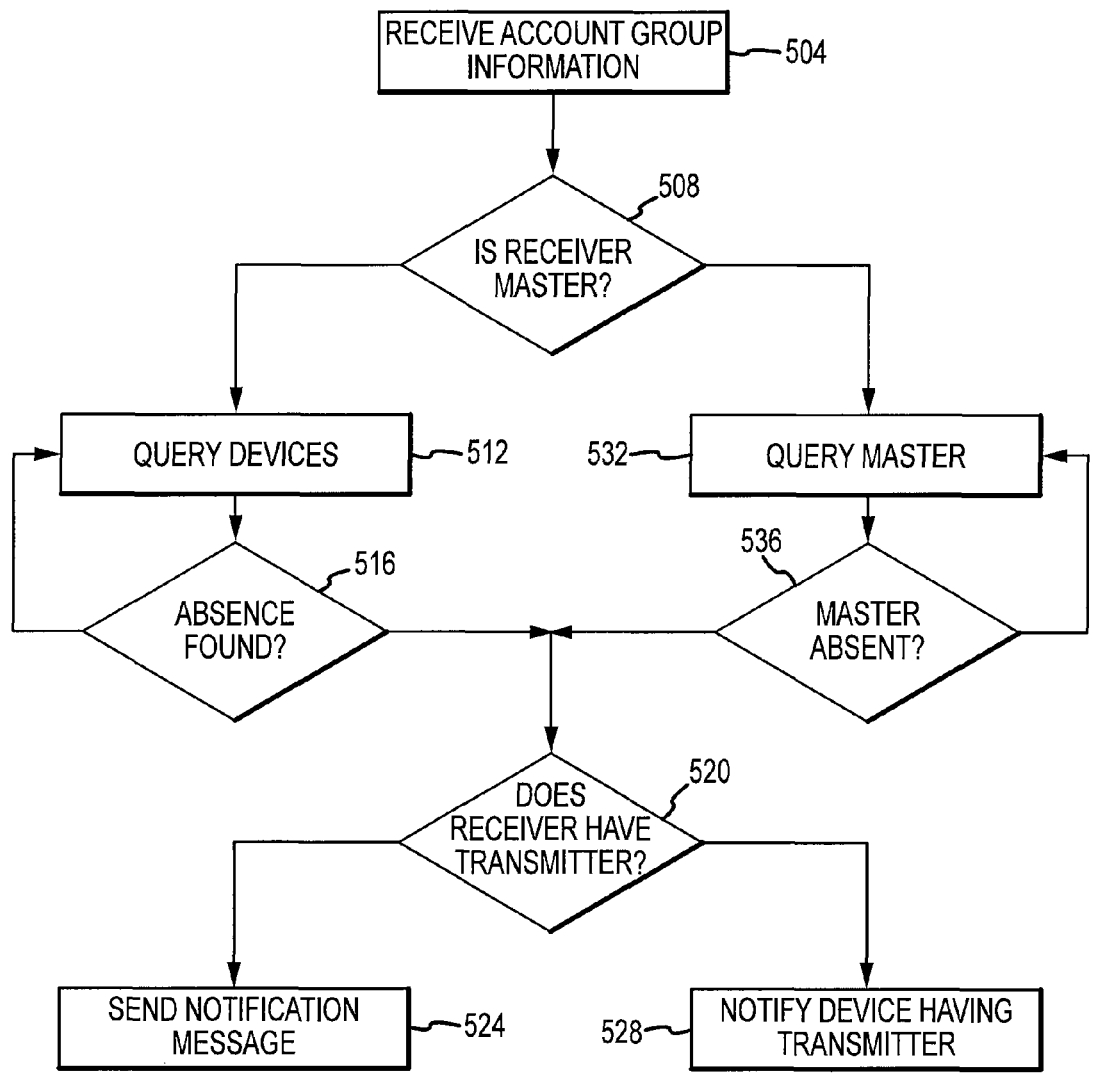
FIG. 5 is a flow chart illustrating operations in a method in accordance with an alternative embodiment of the present invention.

FIG. 5 is a flow chart showing operations of a method of managing an account in a receiver 120*a*. Initially, in operation 504, the receiver 120a receives account group information. The account group information may include information usable by the receiver 120a to identify other receivers 120b-n that are also associated with the same account to which the receiver 120a belongs. As described above, for each receiver 120b-n in the account group, a receiver ID and a smart card ID are provided to allow the receiver 120a to be uniquely identified. At operation 508, the receiver 120a determines whether it is to operate in master mode or in slave mode. This information is provided to the receiver 120a by way of a flag or bit included in the account group information.

If the receiver 120a is to operate in master mode, operation 512 follows. In operation 512, the receiver 120a periodically initiates queries over the first network 124 using the account group information. In particular, the receiver 120a directs a network query using receiver IDs and smart card IDs to each of the members of the account group. In operation 516, the receiver 120a determines whether or not an absent device is found. If no absent device is found, the receiver 120a again queries the other devices at an appropriate time (Operation 512). If, in operation 512, an absence is found, operation 520 follows.

At operation 520, the receiver 120a has already determined if one or more of the account receivers is absent. If so, the receiver 120a generally will inform the service provider 104 of this fact. Accordingly, at operation 520 the embodiment determines whether or not the receiver 120a includes a network interface 226 operable to send a notification to the service provider 104. If the device includes a network interface 226, operation 524 follows and the receiver 120a sends a notification to the service provider 104. If the receiver 120a does not include a network interface 226, operation 528 follows wherein the receiver 120a notifies a device having a network interface of the detected receiver absence. The determination made at operation 520 may be needed because not all receivers associated with a particular account include a network interface 226. With reference to the exemplary system shown in FIG. 2, the user premises 108 includes a number of receivers 120a-n, one of which, namely 120a, includes a transmitter 226. It should be appreciated that this configuration is for illustrative purposes and it is contemplated that all receivers 120a-n associated with the user account may individually include a network interface 226. In the exemplary embodiment shown in FIG. 2, the single receiver 120a having a modem 226 may typically be operated in master mode, however, this configuration is not necessary. In particular, it may be the case that the receiver 120a having the modem 226 is designated as a slave device.

In an alternative embodiment, the master device does not periodically issue network queries to the individual devices. Instead the individual devices periodically issue a network transaction or "ping" to the master device. If a network ping is not received from a particular device at a particular time, rather at an expected time, the master device may determine that a network device operating in slave mode is absent. Accordingly, this absence may then be reported to the service provider 104. In accordance with still another alternative embodiment of the present invention, the master device may periodically report to the service provider 104 that all associated network devices are present. Here, a determination of an absent receiver is made at the service provider 104, rather than at a particular receiver 120a-n. In the case that this periodic notification from the master device is not received, a determination is made at the service provider 104 that one or more of the receivers 120a-n is absent. Accordingly as used herein a status of a receiver may refer to the case where a receiver is absent. Alternatively a status may refer to the case wherein a receiver is periodically reported as being present.

Referring again to operation 508, if a determination is made that the receiver 120a is not to be operated in master mode, operation 532 follows. Operating in slave mode, a receiver 120a typically will not query all devices associated with a user account. In one embodiment, the receiver will only query the receiver indicated as being the master device (Operation 532). In operation 536, a determination is made by the receiver 120a operating in slave mode if the master is found to be absent. If in operation 536, it is determined that the master device is absent, step 520 follows wherein a message or a notification is sent to the service provider 104.

It should be noted that a receiver operating in slave mode may detect the absence of a master device. In the instance that the master device is the only device having a transmitter 226, the slave device generally waits for the master device to return in order to send a notification to the service provider 104. More particularly, if a user disconnects or removes the master device, this absence will be recorded at a slave device. When the master device is reconnected, the master device will be informed of its absence by a message to it from the slave device. At this time, the master device may inform the service provider 104 of its own absence. In certain embodiments, after the slave cannot detect the master device for a set period of time, the slave may automatically shut down itself and/or other slave devices until the master returns. The slave may shut down all functions except for intermittent queries to the master to facilitate this operation.

The foregoing merely illustrates certain principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. In a receiver, a method of managing a group of receivers, comprising:
   receiving an incoming message at a first receiver from a service provider across a communication pathway also used to receive a program service transmission, the first receiver being a member of a group of receivers, the incoming message including information usable by the first receiver to identify all members of the group of receivers through a first network;
   receiving, at the first receiver and over the first network, an indication of a status of at least one receiver in the group of receivers; and
   sending an outgoing message from the first receiver to the service provider, the outgoing message including the status of the at least one receiver.

2. The method of claim 1, wherein the indication of the status of the at least one receiver is received at the first receiver in response to a query initiated by the first receiver over the first network.

3. The method of claim 1, wherein:
   the at least one receiver is the first receiver; and the indication of the status includes an absence of the first receiver, the indication being received at the first receiver from a second receiver after an occurrence of the absence; and the absence is recorded at the second receiver in response to a query initiated by the second receiver over the first network.

4. The method of claim 1, wherein:

the incoming message includes an indication that the first receiver is to operate in a master mode; and when in the master mode, the first receiver periodically queries across the first network to at least one of the group of receivers to determine if any member of the group of receivers is absent.

5. The method of claim 1, wherein:

the incoming message includes an indication that the first receiver is to operate in a master mode; and in the master mode, the first receiver periodically receives messages from at least one receiver across the network the messages indicating that the at least one receiver is present.

6. The method of claim 1, wherein:

the incoming message includes an indication that the first receiver is to operate in a slave mode; and in the slave mode the first receiver does not initiate queries over the first network to all members of the group of receivers.

7. The method of claim 6, wherein:

the at least one receiver is a second receiver, the second receiver being a member of the group of receivers;

the absence of the second receiver being determined by a query initiated over the first network by a third receiver, the second receiver operating in a master mode in response to a second incoming message received at the second receiver; and the indication of the absence of the second receiver being received at the first receiver as a result of a message sent from the third receiver across the first network.

8. The method of claim 1, further comprising:

receiving an incoming command at the first receiver, the incoming command causing the first receiver to at least one of:
(i) display a message to a user regarding the absence associated with the at least one receiver; and
(ii) disable the first receiver.

9. The method of claim 1, wherein the incoming message is a portion of an entitlement management message sent over a satellite communication link, and wherein the outgoing message is sent over a different communication link.

10. The method of claim 1, wherein each member of the group of receivers is a set top box having a smartcard, the information included in the incoming message including, for all members of the group of receivers, at least a portion of a receiver identification number and at least a portion of a smartcard identification number.

11. The method of claim 10, wherein the status of the group of receivers includes an indication that at least one receiver is absent.

12. The method of claim 11, wherein the predetermined action includes notifying a user associated with a user account of the detected absence of the second receiver.

13. The method of claim 11, wherein the predetermined action includes disabling a user account.

14. In a service provider, a method of managing a group of receivers comprising:

sending an outgoing message from a service provider across a communication pathway also used to send a program service transmission to each of a plurality of receivers, each outgoing message including information usable by a particular receiver to identify all others of the plurality of receivers;

receiving an incoming message at the service provider, the incoming message including a status of the group of receivers, an indication that a first receiver of the plurality of receivers has detected an absence of at least a second receiver of the plurality of receivers; and in response to receiving the message, taking at least one predetermined action.

15. A first receiver, the receiver being a member of a group of receivers, the group including at least a second receiver, the first receiver comprising:

a tuner operable to receive a signal from a service provider across a communication pathway also used to receive a program service transmission;

a decoder connected to the tuner and configured to decode the signal into a data set, the data set including information usable by the first receiver to identify all members of the group of receivers;

a storage device connected to the decoder and configured to digitally store the data set;

a processor connected to the storage device and configured to send and receive data over the a network, data received over the first network including at least an indication of a status associated with at least one receiver in the group of receivers; and a network interface connected to the processor and being operable to provide a connection to the first network, the first network interconnecting the group of receivers;

wherein the network interface is further operable to send a notice of the status associated with the at least one receiver to the service provider.

16. The first receiver of claim 15, wherein the at least one receiver is the second receiver and the indication of the status of the second receiver is received at the first receiver in response to a query initiated by the processor over the first network.

17. The first receiver of claim 15, wherein:

the at least one receiver is the first receiver and the indication of the status includes an absence of the first receiver;

the indication being received at the first receiver from the second receiver after an occurrence of the absence, the absence being recorded at the second receiver in response to a query initiated by the second receiver across the first network.

18. The first receiver of claim 15, wherein the data set includes an indication that the first receiver is to operate in a master mode wherein in the master mode the first receiver periodically queries across the first network to at least one of the group of receivers to determine if any member of the group of receivers is absent.

19. The first receiver of claim 15, wherein the data set includes an indication that the first receiver is to operate in a slave mode, wherein in the slave mode the first receiver does not initiate queries over the first network to all members of the group of receivers.

20. The first receiver of claim 19, wherein the at least one receiver is a third receiver, the third receiver being a member of the group of receivers, the status including an absence of the third receiver determined by query initiated over the first network by the second receiver, the second receiver operating in a master mode in response to a second incoming message received at the second receiver, the indication of the absence of the third receiver being received at the first receiver as a result of a message sent from the second device over the first network.

21. A method for managing a group of receivers, comprising:
receiving an incoming message at a first receiver from a service provider across a communication pathway also used to receive a program service transmission, the first receiver being a member of a group of receivers, the incoming message including information usable by the first receiver to identify at least one other member of the group of receivers through a first network;
initiating, by the first receiver, a status query of the at least one other receiver; and
in the event no reply is received from the at least one other receiver within a predetermined interval, disabling at least some functionality of the first receiver.

22. The method of claim 21, wherein the predetermined interval is a time.

23. The method of claim 21, wherein the predetermined interval is a number of status queries of the at least one other receiver.

* * * * *